United States Patent
Sato et al.

(10) Patent No.: US 9,443,620 B2
(45) Date of Patent: Sep. 13, 2016

(54) REACTOR CONTAINMENT VESSEL AND NUCLEAR POWER PLANT USING THE SAME

(75) Inventors: Takashi Sato, Kanagawa (JP); Makoto Akinaga, Kanagawa (JP); Yoshihiro Kojima, Kanagawa (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 911 days.

(21) Appl. No.: 13/351,691

(22) Filed: Jan. 17, 2012

(65) Prior Publication Data

US 2012/0121056 A1 May 17, 2012

Related U.S. Application Data

(63) Continuation-in-part of application No. PCT/JP2010/004679, filed on Jul. 21, 2010.

(30) Foreign Application Priority Data

Sep. 8, 2009 (JP) ................................. 2009-206761

(51) Int. Cl.
*G21C 9/00* (2006.01)
*G21C 9/004* (2006.01)
(Continued)

(52) U.S. Cl.
CPC ............... *G21C 9/004* (2013.01); *G21C 13/10* (2013.01); *G21C 9/016* (2013.01); *G21C 15/18* (2013.01); *Y02E 30/40* (2013.01)

(58) Field of Classification Search
CPC ....... Y02E 30/34; Y02E 30/40; G21C 9/004; G21C 9/016; G21C 13/00; G21C 13/02; G21C 13/10; G21C 13/022; G21C 1/024; G21Y 2002/50

USPC ...... 376/280, 282, 294, 283, 352; 55/31, 33; 144/13
See application file for complete search history.

(56) References Cited

U.S. PATENT DOCUMENTS 3,028,327 A *  4/1962 Weeks .......................... 376/300
3,115,450 A    12/1963 Schanz
(Continued)

FOREIGN PATENT DOCUMENTS

CN    1892922 A    1/2007
JP    04-69595 A   3/1992
(Continued)

OTHER PUBLICATIONS

Translation of International Preliminary Report on Patentability of PCT/JP2010/004679, dated Apr. 19, 2012, 6 pages.

*Primary Examiner* — Marshall O'Connor
(74) *Attorney, Agent, or Firm* — Foley & Lardner LLP (57) ABSTRACT

According to an embodiment, a nuclear reactor containment vessel has: a primary reactor containment vessel which contains a nuclear pressure vessel; a secondary reactor containment vessel and which is disposed outside the primary reactor containment vessel which has the pressure resistant properties and the leak-tightness which are equivalent to those of the primary reactor containment vessel; an air bag which is disposed within the secondary reactor containment vessel and which, when a failure occurs in primary reactor containment vessel, expands while receiving and encapsulating a high pressure gas discharged from the inside of the primary reactor containment vessel; and a gas phase vent pipe which connects the primary reactor containment vessel and the air bag.

9 Claims, 3 Drawing Sheets

(51) Int. Cl.
  *G21C 13/10*   (2006.01)
  *G21C 9/016*   (2006.01)
  *G21C 15/18*   (2006.01)

(56) References Cited

U.S. PATENT DOCUMENTS 4,636,226 A * 1/1987 Canfora ................... 95/138
4,829,648 A * 5/1989 Arzenti et al. ........... 29/890.031
2007/0092053 A1* 4/2007 Sato ............................... 376/283

FOREIGN PATENT DOCUMENTS

| JP | H04-069595 | * | 4/1992 | ............ G21C 13/00 |
| JP | 2004-333357 A | | 11/2004 | |
| JP | 2007-010457 A | | 1/2007 | |
| RU | 2093909 C1 | | 10/1997 | |

* cited by examiner

REACTOR CONTAINMENT VESSEL AND NUCLEAR POWER PLANT USING THE SAME

CROSS REFERENCES TO RELATED APPLICATIONS

This application is a continuation-in-part (CIP) application based upon the International Application PCT/JP2010/004679, the International Filing Date of which is Jul. 21, 2010, the entire content of which is incorporated herein by reference, and claims the benefit of priority from the prior Japanese Patent Application No. 2009-206761, filed in the Japanese Patent Office on Sep. 8, 2009, the entire content of which is incorporated herein by reference.

FIELD

The present invention relates to a reactor containment vessel of a boiling water reactor and a nuclear power plant using the same.

BACKGROUND

In general, a boiling water reactor (BWR) adopts a primary reactor containment vessel of a pressure suppression type, and has hence an advantage of being able to reduce the volume of the primary reactor containment vessel. In the case of the boiling water reactor, the atmosphere in the primary reactor containment vessel is inerted with nitrogen gas to make the oxygen concentration lower than a concentration of oxygen contained in a normal air atmosphere. Therefore, if core fuel rises in temperature at the time of an accident and reacts with coolant to generate hydrogen, there is no risk of occurrence of detonation or deflagration in the primary reactor containment vessel. Further, the boiling water reactor adopts a small primary reactor containment vessel, and the outside of the primary reactor containment vessel is completely doubly housed in a reactor building. Thus, even in the case of a design basis accident, double confinement of radioactive materials can be ensured.

The safety of the boiling water reactor is extremely high, and there has been no outbreak of a design basis accident or an accident in which the integrity of the core fuel is impaired to the slightest degree at all. Further, according to the probabilistic safety assessment (PSA), it has been confirmed that the reactor core damage frequency of the boiling water reactor is as sufficiently low as about $10^{-5}$/reactor-year (r-y) to $10^{-6}$/reactor-year for old models and as further low as $10^{-7}$/reactor-year to $10^{-8}$/reactor-year. Even so, in the design of a next-generation reactor, a policy is adopted in which the design is made so as to ensure tolerance on the assumption that a severe accident could occur.

When an occurrence of a severe accident is assumed in the design of a next-generation reactor, there may be case where a large amount of hydrogen is generated upon occurrence of the severe accident due to metal-water reaction between high-temperature reactor fuel and coolant, and the pressure in the primary reactor containment vessel rises exceeding a design pressure limit. For example, in the case of an advanced boiling water reactor (ABWR), the design pressure of the primary reactor containment vessel is 310 kPa (45 psig); however, when a large amount of hydrogen is generated upon occurrence of a severe accident, the pressure in the primary reactor containment vessel may reach about twice the design pressure. In this regard, although it has been confirmed that the primary reactor containment vessel of the advanced boiling water reactor can endure a pressure three times the design pressure, a state where the pressure in the primary reactor containment vessel continues exceeding the design pressure for a long period of time upon occurrence of the severe accident is unfavorable in terms of safety. When the pressure in the primary reactor containment vessel exceeds the design pressure, radioactive gas inside the primary reactor containment vessel may leak at a leak rate higher than a design leak rate.

In the case of a design basis accident, the pressure in the primary reactor containment vessel is limited to a design pressure or less, and the leak rate of the radioactive gas inside the primary reactor containment vessel is limited to the design leak rate or less. In this case, the pressure in a reactor building hardly rises and, thus, the reactor building is not damaged at all. Further, in the case of the design basis accident, an active exhaust fan and a filter are used to discharge the gas in the reactor building through an exhaust pipe, thereby maintaining the pressure in the reactor building at a negative pressure relative to the atmospheric pressure. As a result, the reactor building has a double barrier against diffusion of radioactive materials to the atmosphere. However, upon occurrence of the severe accident, there is a possibility that the active exhaust fan fails due to loss of power or the like, which may cause a loss of the double confinement function of the reactor building.

In order to limit a pressure rise in the primary reactor containment vessel upon occurrence of the severe accident, it is effective to vent the gas in the primary reactor containment vessel to the reactor building serving as a secondary reactor containment vessel. However, the reactor building has a low design pressure, and the gas therein is normal air, so that if high-pressure gas in the primary reactor containment vessel containing a large amount of hydrogen generated upon occurrence of the severe accident is discharged to the reactor building, detonation may occur in the reactor building to damage the reactor building, resulting in uncontrolled release of radioactive gas to the atmosphere. This situation resembles the situation of the severe accident in Chernobyl nuclear plant. Thus, this method is not technically feasible, although having been proposed, and there has been no actual boiling water reactor that adopts such a dangerous method until now. Incidentally, the design pressure of the reactor building is as low as 13.8 kPa (2 psig or 0.14 kg/cm$^2$). However, this value does not mean that a conventional reactor building is fragile but is intentionally set as the pressure at which a blow-out panel, which is installed for safety purpose, is to be opened.

As a method that is technically feasible, there is known one in which the gas in the primary reactor containment vessel upon occurrence of the severe accident is released to the environment through a filter. However, radioactive noble gas and organic iodine are released to the environment, without being eliminated, so that radiation exposure to the public occurs. Further, in order to reduce the radiation exposure to the public to the minimum, it is necessary to previously evacuate every people living within a certain distance.

Recently, in an ESBWR, an excellent method is adopted in which steam to be released to the primary reactor containment vessel upon occurrence of an accident is condensed by a passive containment cooling system (PCCS) to suppress a pressure rise due to the decay heat of the primary reactor containment vessel. However, a large amount of hydrogen released upon occurrence of a severe accident is not condensed by the PCCS, and the volume of the primary reactor containment vessel of the ESBWR is small, so that the pressure in the primary reactor containment vessel upon occurrence of the severe accident is maintained at twice or three times the design pressure after all. That is, even when the PCCS is installed in the conventional reactor containment vessel having a small volume, the pressure in the reactor containment vessel upon occurrence of the severe accident cannot be limited to the design pressure or less. Incidentally, the design pressure of the primary reactor containment vessel of the ESBWR is also 310 kPa (45 psig).

Under the above circumstances, recently, there has been disclosed an innovative reactor containment vessel having a configuration in which an upper space including an operation floor is used as a pressure-resistant upper secondary reactor containment vessel and high-pressure gas in the primary reactor containment vessel is vented to the secondary reactor containment vessel (See Jpn. Pat. Appln. Laid-Open Publication No. 2007-10457, the entire content of which is incorporated herein by reference.). The pressure resistance in this case means that the upper secondary reactor containment vessel is designed to have substantially the same design pressure as that of the primary reactor containment vessel. However, in this reactor containment vessel, there was a necessity to make the atmosphere in the space including an operation floor lower in oxygen concentration than normal air atmosphere in order to prevent occurrence of hydrogen detonation. In this circumstance, operators cannot enter the space including an operation floor during normal operation of the plant for, e.g., fuel transportation. If the atmosphere of the space including an operation floor is air, a large amount of hydrogen generated upon occurrence of the severe accident needs to be burned or recombined by an igniter or a recombiner, generating a large amount of heat generation to raise the temperature of the reactor containment vessel to 200° C. or more, which may cause overtemperature failure.

In the case of a next-generation reactor, the designed lifetime of a plant is as long as 60 years to 80 years and thus there is a possibility that the number of residents in the vicinity of the plant increase after the construction of the plant. The increase in the number of the peripheral residents makes it difficult to fulfill complete evacuation of all the residents, which is required to be carried out as an emergency planning upon occurrence of the severe accident. When the number of the peripheral residents is limited, it becomes difficult to construct a nuclear plant in the vicinity of a heavily-populated large city. Even if being constructed in the vicinity of a densely populated large city, the safety of a next-generation reactor must be fully guaranteed by the inherent design safety of the plant.

Further, the next-generation reactor is likely to be constructed in any location all over the world and is therefore at risk of encountering a natural disaster such as a giant earthquake, a large tsunami, and a mega hurricane. When a severe accident occurs due to such severe natural disasters, it is difficult to fulfill complete evacuation of all the residents in the vicinity of the plant. We must understand that the next-generation reactors of all over the world are at risk of encountering very sever natural disasters, such as a mega cyclone, a giant earthquake, and a large tsunami. If a severe natural disaster such as a great cyclone occurs followed by a station blackout (SBO), there is a possibility that recovery work cannot be carried out for a long time period. Thus, it is necessary to provide a next-generation reactor safe enough to prevent the consequence of the severe accident due to such a prolonged station blackout from reaching over the offsite and to eliminate the need for evacuation of the peripheral residents.

As described above, it is desirable to provide the next-generation reactor safe enough to eliminate the need for evacuation of the peripheral residents if the severe accident occurs due to a devastating natural disaster. To this end, it is necessary to conduct design so as to maintain the pressure in the reactor containment vessel upon occurrence of the severe accident at a design pressure or less, to prevent the integrity of the reactor containment vessel from being impaired due to occurrence of detonation or deflagration of a large amount of hydrogen, and to prevent radioactive noble gas or organic iodine from being released to the environment through a filter vent. Further, it is desirable to provide a configuration in which leakage of radioactive materials from the reactor containment vessel can be passively prevented without use of an external power source. Further, at the normal operation time of the plant, it is desirable that operators can conduct their work on the operation floor.

BRIEF DESCRIPTION OF THE DRAWINGS

The features and advantages of the present invention will become apparent from the discussion hereinbelow of specific, illustrative embodiments thereof presented in conjunction with the accompanying drawings, in which.

DETAILED DESCRIPTION

In order to attain a design goal of such a next-generation reactor, an object of the present embodiment is to provide a reactor containment vessel and a nuclear power plant using the same capable of, when high-pressure gas containing a large amount of hydrogen is vented from the primary reactor containment vessel to a space including the operation floor, preventing occurrence of detonation or deflagration of the hydrogen, capable of passively preventing leakage of radioactive materials contained in the high-pressure gas, and capable of using normal air atmosphere as the atmosphere in the space including the operation floor at the normal operation time of the plant so as to allow operators to enter the space above the operation floor for working.

In order to achieve the above described object, there is presented, as an embodiment, a reactor containment vessel comprising: a primary reactor containment vessel containing a reactor pressure vessel and having a certain pressure resistance higher than atmospheric pressure and leak-tightness; a secondary reactor containment vessel installed outside the primary reactor containment vessel and having a pressure resistance and leak-tightness equivalent to those of the primary reactor containment vessel; an air bag installed in the secondary reactor containment vessel and capable of receiving high-pressure gas released from the primary reactor containment vessel upon occurrence of an accident in the primary reactor containment vessel and being expanded while confining the gas therein; and a gas phase vent pipe connecting the primary reactor containment vessel and the air bag.

There is also presented, as an embodiment, a nuclear power plant comprising: a reactor pressure vessel incorporating core fuel; a primary reactor containment vessel containing a reactor pressure vessel and having a certain pressure resistance higher than atmospheric pressure and leak-tightness; a secondary reactor containment vessel installed outside the primary reactor containment vessel and having a pressure resistance and leak-tightness equivalent to those of the primary reactor containment vessel; an air bag installed in the secondary reactor containment vessel and capable of receiving high pressure gas released from the primary reactor containment vessel upon occurrence of an accident in the primary reactor containment vessel and being expanded while confining the gas therein; a gas phase vent pipe connecting the primary reactor containment vessel and the air bag; a passive containment cooling system for cooling the primary reactor containment vessel upon occurrence of an accident; and an isolation condenser for cooling the core fuel in reactor isolation time.

According to the present embodiments, there can be provided a next-generation boiling water reactor capable of eliminating the need to evacuate peripheral residents even if a severe accident occurs due to a devastating natural disaster and allowing operators to enter a space including an operation floor so as to engage in his or her work at all times.

Specific embodiments of a reactor containment vessel and a nuclear power plant using the same will be described with reference to the accompanying drawings. The same reference numerals are given to the same or similar parts, and the repeated description will be omitted. Although only one valve is illustrated for each of various valves in the accompanying drawings for simplicity, actually a plurality of valves are provided in parallel or in series in terms of reliability. The nuclear plant according to the present invention is not limited to a nuclear power generation plant but may be a nuclear plant other than that for power generation use.

[First Embodiment]

Figure 1:
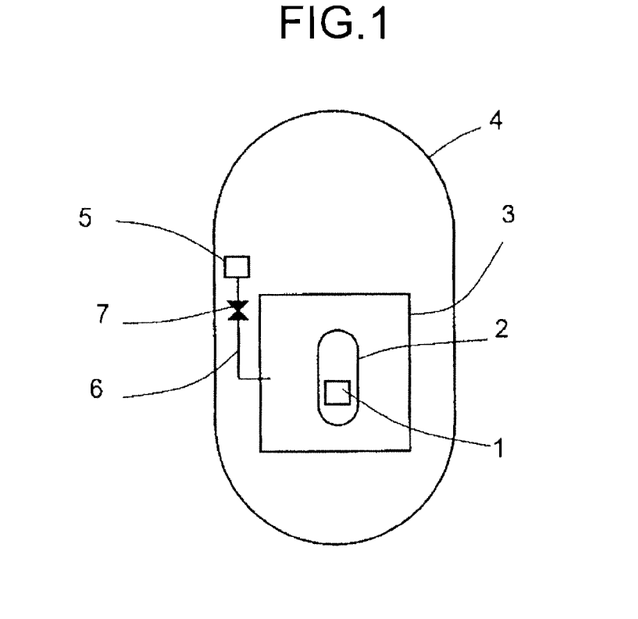
FIG. 1 is an elevational cross-sectional view schematically illustrating a configuration of a first embodiment of a reactor containment vessel according to the present invention, which shows a normal operation state.
Figure 2:
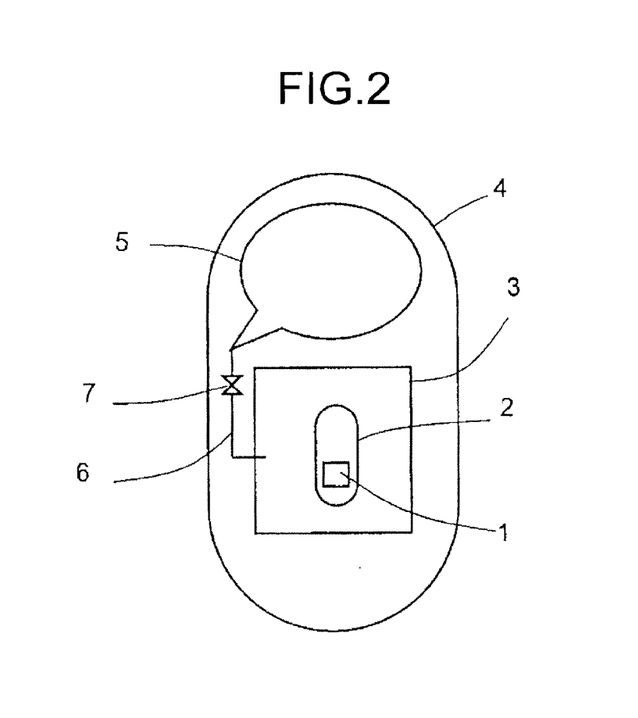
FIG. 2 is an elevational cross-sectional view illustrating a state where an accident has occurred in the reactor containment vessel of FIG. 1.

FIG. 1 is an elevational cross-sectional view schematically illustrating a configuration of a first embodiment of a reactor containment vessel according to the present invention, which shows a normal operation state. FIG. 2 is an elevational cross-sectional view illustrating a state where an accident has occurred in the reactor containment vessel of FIG. 1.

The reactor containment vessel according to the present embodiment contains a reactor core 1 and a reactor pressure vessel 2 containing the reactor core 1. A large number of core fuel elements (not illustrated) are contained in the reactor core 1. A secondary reactor containment vessel 4 is provided around a primary reactor containment vessel 3. Although a complete double-containment configuration in which the secondary reactor containment vessel 4 completely encloses the periphery of the primary reactor containment vessel 3 is illustrated for simplification, a partial double containment configuration in which the secondary reactor containment vessel 4 partially encloses the primary reactor containment vessel 3 may be adopted.

A folded air bag 5 is installed inside the secondary reactor containment vessel 4. The air bag 5 communicates with a gas phase of the primary reactor containment vessel 3 through a gas phase vent pipe 6 and an isolation-communication switching unit 7. As the isolation-communication switching unit 7, a rapture disk, an automatic isolation valve, or the like may be used.

Both the primary reactor containment vessel 3 and the secondary reactor containment vessel 4 have pressure resistance. The design pressure of the primary reactor containment vessel 3 is set to, e.g., about 310 kPa (45 psig) and that of the secondary reactor containment vessel 4 is set to about 207 kPa (30 psig) which is equivalent to the design pressure of the primary reactor containment vessel 3. The design pressure of the secondary reactor containment vessel may be exactly equal to the design pressure of the primary reactor containment vessel. Further, both the primary reactor containment vessel 3 and the secondary reactor containment vessel 4 have leak-tightness.

At the normal operation time, the atmosphere in the primary reactor containment vessel 3 is inerted with nitrogen gas to make the oxygen concentration lower than a concentration of oxygen contained in a normal air atmosphere. Meanwhile, the atmosphere in the secondary reactor containment vessel 4 is normal air. Thus, at the normal operation time, operators can stay inside the secondary reactor containment vessel 4 so as to freely engage in inspection, fuel transportation work or the like. In this state, the isolation-communication switching unit 7 is in an isolated mode.

As illustrated in FIG. 2, when an accident occurs in the primary reactor containment vessel 3, coolant flows out from the reactor pressure vessel 2, resulting in generation of a large amount of steam. Further, when a severe accident accompanied by severe damage of the reactor fuel occurs, a large amount of hydrogen is generated due to metal-water reaction between the reactor fuel and coolant. When the pressure in the primary reactor containment vessel 3 rises as a result of the generation of the steam and hydrogen and reaches a predetermined value, the isolation-communication switching unit 7 automatically switches to a communicated mode. As a result, high-pressure gas in the primary reactor containment vessel 3 is discharged through the gas phase vent pipe 6 to the inside of the air bag 5, whereby the air bag 5 starts being expanded.

After the start of expansion of the air bag 5, the pressure in the primary reactor containment vessel 3 is reduced. Meanwhile, the atmosphere in the secondary reactor containment vessel 4 is compressed (pressurized) to counteract the pressure of the high-pressure gas in the air bag 5. The expansion of the air bag 5 is stopped at the time when the pressure in the secondary reactor containment vessel 4 and the pressure of the high-pressure gas in the air bag 5 are equalized. Since the high-pressure gas in the air bag 5 communicates with the atmosphere in the primary reactor containment vessel 3 through the gas phase vent pipe 6, the pressure of the high-pressure gas is equal to the pressure in the primary reactor containment vessel 3. That is, at the time when the expansion of the air bag 5 is finished, the equalization of the pressure in the primary reactor containment vessel 3 and the pressure in the secondary reactor containment vessel 4 is achieved.

When the equalization of the pressure of the high-pressure gas in the air bag 5 and the pressure in the secondary reactor containment vessel 4 has been achieved, the difference between the inside and outside of the air bag 5 becomes zero, so that the hydrogen and radioactive gas contained in the high-pressure gas in the air bag 5 stops leaking from the air bag 5 to the inside of the secondary reactor containment vessel 4, although they have high pressure. Further, the pressure in the primary reactor containment vessel 3 and the pressure in the secondary reactor containment vessel 4 are also equalized, so that the atmosphere in the primary reactor containment vessel 3 stops leaking to the secondary reactor containment vessel 4.

The air bag 5 is expanded by the energy of the high-pressure gas in the primary reactor containment vessel 3 to pressurize the secondary reactor containment vessel 4, and the atmosphere in the secondary reactor containment vessel 4 pressurizes all the surrounding areas of the primary reactor containment vessel 3 and the air bag 5. Thus, it is possible to passively prevent the leakage of the high-pressure gas from the primary reactor containment vessel 3 and the air bag 5 without use of an external power source.

The air bag 5 is expanded in accordance with the discharge speed of the high-pressure gas discharged from the primary reactor containment vessel 3. The exceeding of the pressure in the primary reactor containment vessel 3 over the design pressure is attributed to a large amount of hydrogen generated upon occurrence of a severe accident. The metal-water reaction between the reactor fuel and water of the coolant may generate a large amount of hydrogen, but it takes at least several minutes to several tens of minutes to proceed. Further, it is possible to reduce the discharge speed of the high-pressure gas by providing an orifice (not illustrated) in the gas phase vent pipe 6 or by reducing the opening degree of the isolation-communication switching unit 7. Therefore, unlike the case of an automobile air bag for protecting passengers, the expansion of the air bag 5 progresses very slowly. That is, fast expansion performance required for the automobile air bag is not included in the design condition. Thus, the air bag 5 is, even with a large capacity, expanded steadily and slowly. An example of the material of the air bag 5 includes one obtained by combining a plastic material with a nonflammable material, which is used for a life boat or an air dome.

[Second Embodiment]

Figure 3:
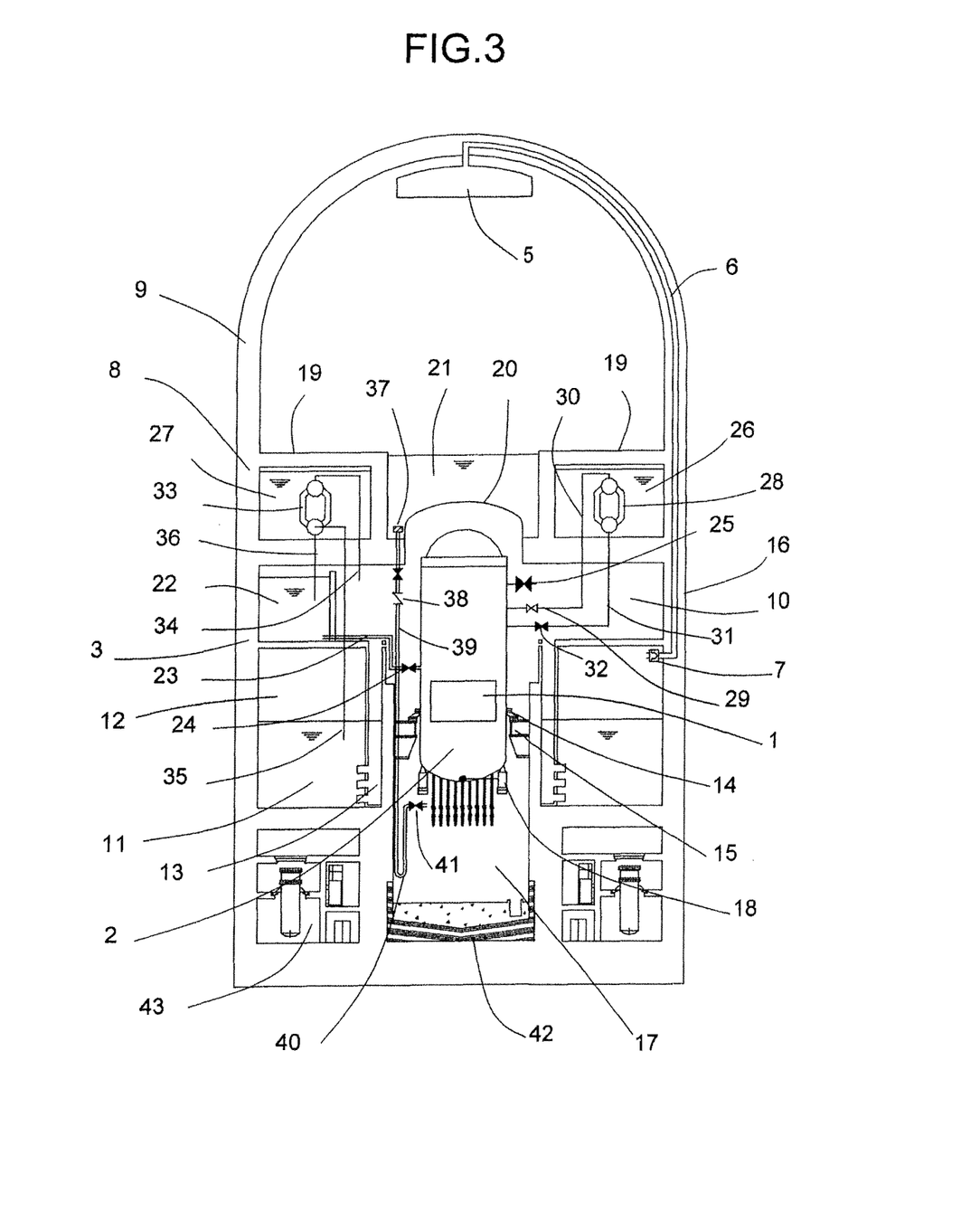
FIG. 3 is an elevational cross-sectional view schematically illustrating a configuration of a second embodiment of the reactor containment vessel according to the present invention, which shows a normal operation state.
Figure 4:
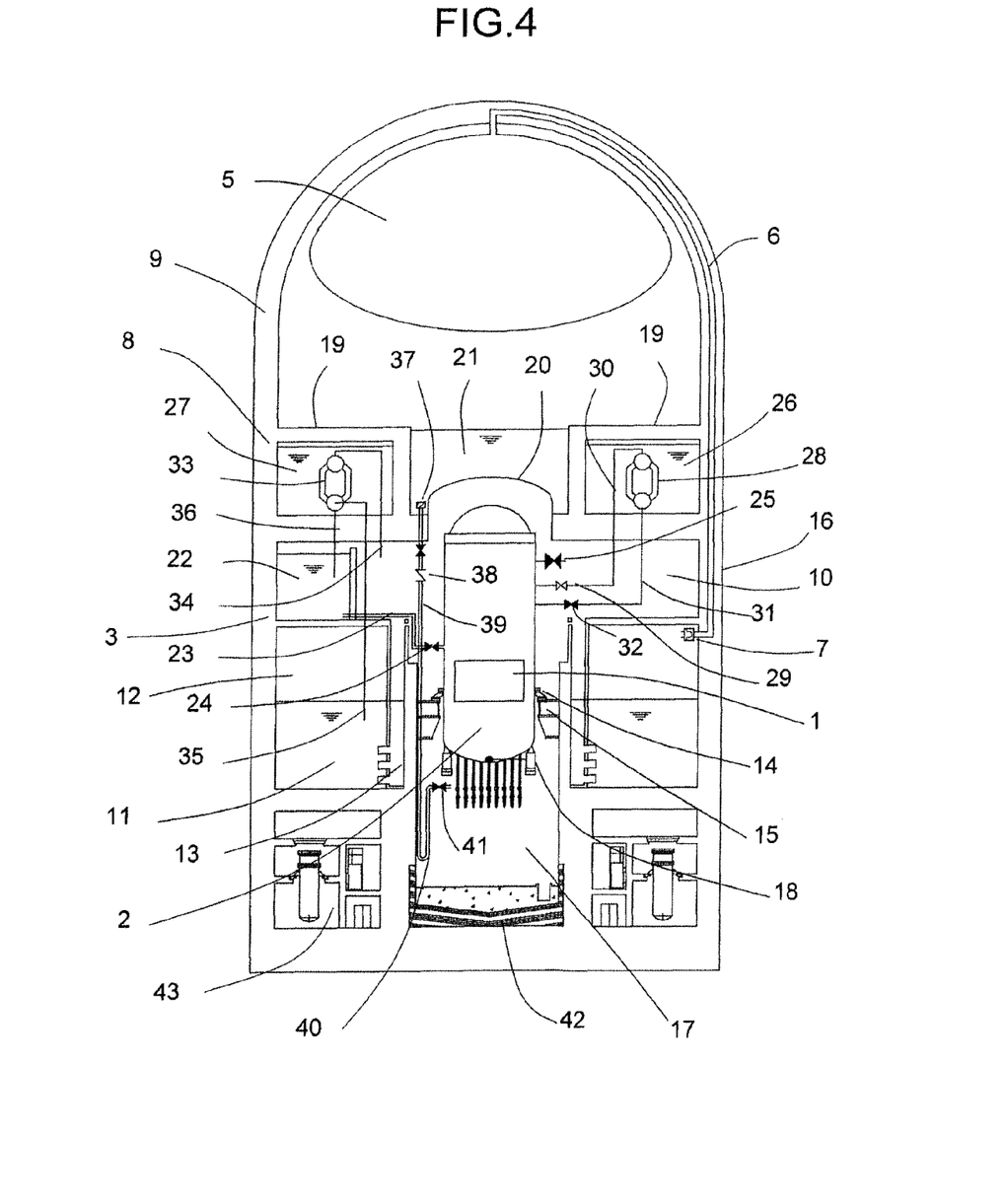
FIG. 4 is an elevational cross-sectional view illustrating a state where an accident has occurred in the reactor containment vessel of FIG. 3.

FIG. 3 is an elevational cross-sectional view schematically illustrating a configuration of a second embodiment of the reactor containment vessel according to the present invention, which shows a normal operation state. FIG. 4 is an elevational cross-sectional view illustrating a state where an accident has occurred in the reactor containment vessel of FIG. 3.

A reactor containment vessel 8 according to the present embodiment includes a cylindrical primary reactor containment vessel 3 and a domed secondary reactor containment vessel (hereinafter, referred to as "upper secondary reactor containment vessel") 9 disposed above the primary reactor containment vessel 3. The outer wall of the reactor containment vessel 8 has a cylindrical shape at its lower part and a dome shape at its upper part. The reactor containment vessel 8 contains the reactor pressure vessel 2 containing the reactor core 1. A large number of core fuel elements (not illustrated) are contained in the reactor core 1.

Both the primary reactor containment vessel 3 and the upper secondary reactor containment vessel 9 have pressure resistance. The design pressure of the primary reactor containment vessel 3 is set to, e.g., about 310 kPa (45 psig) and that of the upper secondary reactor containment vessel 9 is set to about 207 kPa (30 psig) which is equivalent to the design pressure of the primary reactor containment vessel 3. The design pressure of the upper secondary reactor containment vessel 9 may be exactly equal to the design pressure of the primary reactor containment vessel 3. Further, both the primary reactor containment vessel 3 and the upper secondary reactor containment vessel 9 have leak-tightness.

The primary reactor containment vessel 3 is constituted by a dry well 10 containing the reactor pressure vessel 2 and a wet well 12 containing a suppression pool 11. The dry well 10 communicates with the suppression pool 11 through about ten LOCA (loss-of-coolant accident) vent pipes 13. The reactor pressure vessel 2 is supported by a vessel support 15 through a vessel skirt 14.

In the dry well 10, the space above the vessel support 15 is called "upper dry well 16" and the space below the same is called "lower dry well 17". The upper dry well 16 and the wet well 12 constitute a part of the outer wall of the reactor containment vessel 8. Thus, pipes extending from the upper dry well 16 and the wet well 12 can reach the outside of the reactor containment vessel 8 by penetrating directly the outer wall only once. That is, the reactor containment vessel 8 has a single structure.

Alternatively, for reasons such as need to increase the area of the operation floor, the reactor's primary reactor containment vessel may be made to have a double cylindrical wall structure. More specifically, the inner diameter of the upper secondary reactor containment vessel is made larger than the outer diameter of the primary reactor containment vessel, and the cylindrical part of the upper secondary reactor containment vessel is extended down to the base, whereby the cylindrical part of the primary reactor containment vessel is doubly covered.

In the example of FIG. 3, the reactor contained in the primary reactor containment vessel 3 is an advanced boiling water reactor (ABWR). This type is featured in that some reactor internal pumps (RIPs) 18 are connected to the lower portion of the reactor pressure vessel 2. Another reactor that can be contained is a natural circulation reactor like the ESBWR. In the case of the natural circulation reactor, the internal pumps are not provided.

The upper secondary reactor containment vessel 9 includes an operation floor 19. The primary reactor containment vessel 3 includes a primary reactor containment vessel upper lid 20. The primary reactor containment vessel upper lid 20 is made of steel, disposed just above the reactor pressure vessel 2, and configured to be detachable upon fuel exchange. The primary reactor containment vessel 3 and the upper secondary reactor containment vessel 9 are separated by the primary reactor containment vessel upper lid 20. A water shield 21 for shielding radiation released from the reactor core 1 at the normal operation time covers the upper portion of the primary reactor containment vessel upper lid 20.

The outer wall of the upper secondary reactor containment vessel 9 has a dome shape, and the air bag 5 is installed in the vicinity of the top portion of the dome. Normally, the air bag 5 is in a folded state. A gas phase of the wet well 12 and the air bag 5 in the upper secondary reactor containment vessel 9 are connected by a gas phase vent pipe 6 and an isolation-communication switching unit 7. As the isolation-communication switching unit 7, a rapture disk, an automatic isolation valve, or the like can be used. Although only one pair of the gas phase vent pipe 6 and the isolation-communication switching unit 7 is illustrated in FIG. 3, two or more pairs thereof may be circumferentially arranged. Further, although the gas phase vent pipe 6 passes within the outer wall of the reactor containment vessel 8 by way of example, it may pass inside the reactor containment vessel 8 or outside the same.

The isolation-communication switching unit 7 is in an isolated mode at the normal operation time. Even upon occurrence of a transient incident not accompanied by the pressure rise in the wet well 12 or minor LOCA (loss-of-coolant accident), the isolation-communication switching unit 7 is maintained in the isolated mode.

The material of the upper secondary reactor containment vessel 9 may typically be a concrete. However, any material may be used as long as pressure resistance and leak tightness are ensured. A steel liner or a resin-coated liner (not illustrated) is used to prevent leakage of the atmosphere from the upper secondary reactor containment vessel 9.

In the present embodiment, the atmosphere in the upper secondary reactor containment vessel 9 is normal air. Thus, at the normal operation time, operators can enter the upper secondary reactor containment vessel 9 so as to engage in fuel transportation work and the like in the space including the operation floor at all times.

A gravity-driven cooling system (hereinafter, abbreviated as GDCS) pool 22 is installed in the upper dry well 16 and stores cooling water therein. The GDCS pool 22 is connected to the reactor pressure vessel 2 by an injection pipe 23 and an injection valve 24. Further, a pressure reducing valve 25 is attached to the reactor pressure vessel 2. When the pressure reducing valve 25 is activated to depressurize the reactor pressure vessel 2 and the injection valve 24 is activated, the cooling water in the GDCS pool 22 is injected by gravity into the reactor pressure vessel 2. Further, the cooling water can be drained from the GDCS pool 22 to the lower dry well 17 through a drain pipe and drain valve (both not illustrated).

An isolation condenser (hereinafter, abbreviated as IC) is installed for the purpose of cooling the core fuel in a case where the reactor is in an isolated state as a result of occurrence of a station blackout. Further, a passive containment cooling system (hereinafter, abbreviated as PCCS) is installed for the purpose of cooling the steam to be released into the primary reactor containment vessel 3 upon occurrence of a severe accident and the like.

That is, the IC pool 26 and PCCS pool 27 are installed in the space above the dry well 10 and below the operation floor 19 and they each store the cooling water. An IC heat exchanger 28 is installed in the IC pool 26 and is connected to the reactor pressure vessel 2 through an isolation valve 29, a steam suction pipe 30, a condensate water return pipe 31, and an injection valve 32. Similarly, a PCCS heat exchanger 33 is installed in the PCCS pool 27 and is connected to the gas phase of the dry well 10 through a suction pipe 34. The PCCS heat exchanger 33 is also connected to the suppression pool 11 through a PCCS vent pipe 35, and is connected to the GDCS pool 22 through a condensate water return pipe 36.

The gas phase of the IC pool 26 and the PCCS pool 27 communicate with the space outside the outer wall of the reactor containment vessel 8 through exhaust ports (not illustrated). Therefore, although the IC pool 26 and the PCCS pool 27 are in the space outside the reactor containment vessel 8 in terms of the radiation confinement function, they are actually installed in the space protected by the outer wall of the reactor containment vessel. The outer wall of the reactor containment vessel has been designed with a structural strength high enough to protect the inner equipment including the reactor even against a big airplane crash. Thus, the above configuration provides an effect of protecting both the IC pool 26 and the PCCS pool 27 against a big airplane crash.

Upon occurrence of a transient incident not accompanied by a pressure rise in the dry well 10 or a station blackout, the steam in the reactor pressure vessel 2 is guided to the IC heat exchanger 28, and condensate water is returned to the reactor pressure vessel 2 through the condensate water return pipe 31. This allows long-term cooling of the core fuel without use of an external power source. Thus, even if a long-term station blackout occurs due to a natural disaster such as a giant earthquake, the safety is not impaired.

Further, a strainer 37 is installed inside the water shield 21 so as to allow water of the water shield 21 to be directly guided to the inside of the lower dry well 17 through a check valve 38, a drain pipe 39, a U-shape seal 40, and an injection valve 41. Further, a core catcher 42 is installed on the floor of the lower dry well 17.

Referring to FIG. 4, a function of the reactor pressure vessel according to the second embodiment of the present invention upon occurrence of an accident will be described.

When a large break LOCA or a severe accident occurs, the inside of the dry well 10 is occupied by high-pressure steam. The pressure of the steam causes nitrogen and hydrogen both of which are noncondensable gases in the dry well 10 to pass through the LOCA vent pipes 13 on a short-term basis and to pass through the PCCS vent pipe 35 on a log-term basis, to be vented to the suppression pool 11 and further to be pushed into the gas phase of the wet well 12. As a result, the pressure in the gas phase of the wet well 12 rises. Particularly, upon occurrence of a severe accident accompanied by generation of a large amount of hydrogen, the hydrogen is compressed in the gas phase of the wet well 12 and, if no measure is taken, the pressure in the primary reactor containment vessel 3 rises to twice its design pressure or more.

However, in the present embodiment, when the pressure in the gas phase of the wet well 12 has reached the preset activation pressure of the isolation-communication switching unit 7, the isolation-communication switching unit 7 is activated, causing the gas phase of the wet well 12 and the air bag 5 in the upper secondary reactor containment vessel 9 to communicate with each other through the gas phase vent pipe 6. As a result, the pressure in the primary reactor containment vessel 3 that has excessively risen due to existence of the noncondensable gases such as hydrogen and nitrogen accumulated in the gas phase of the wet well 12 can be released into the air bag 5 in the upper secondary reactor containment vessel 9, thereby significantly suppressing the pressure rise in the primary reactor containment vessel 3.

Alternatively, a method can be considered in which the preset activation pressure of the isolation-communication switching unit 7 is set higher so as not to allow the isolation-communication switching unit 7 to be activated even upon occurrence of a large break LOCA. In this case, a configuration is possible in which the isolation-communication switching unit 7 is activated only upon occurrence of a severe accident accompanied by generation of over-pressure caused by a large amount of hydrogen and is not allowed to be activated upon occurrence of a design basis accident. Thus, upon occurrence of the design basis accident, the pressure is confined in the primary reactor containment vessel 3 and, upon occurrence of the severe accident accompanied by overpressure, both the primary reactor containment vessel 3 and the upper secondary reactor containment vessel 9 are used to endure the over-pressurization generated in the severe accident.

In the thus configured present embodiment, not only the primary reactor containment vessel 3 has the pressure barrier function against the pressure rise upon occurrence of the severe accident, but both the primary reactor containment vessel 3 and the upper secondary reactor containment vessel 9 fulfill the pressure barrier function in collaboration with each other, thereby reducing the pressure in the reactor containment vessel 8 to a lower level. In a conventional reactor containment vessel, a pressure therein becomes twice to three times the design pressure upon occurrence of the severe accident. According to the present embodiment, it is possible to reduce the pressure upon occurrence of the severe accident within the range of the design pressure. The free space volume of the upper secondary reactor containment vessel 9 becomes five to six times the free space volume of the wet well 12. Therefore, the pressure in the reactor containment vessel upon occurrence of the severe accident can be reduced to ⅕ or ⅙ of the conventional case, thereby achieving a reduction of the pressure in the reactor containment vessel to not more than the design pressure.

In a conventional active safety reactor, the pressure in the reactor containment vessel reaches about twice the design pressure upon occurrence of the severe accident and thus it has been necessary to perform reactor containment vessel venting (exhausting). In this case, radioactive gas in the reactor containment vessel needs to be released to the atmosphere, so that it is necessary to evacuate in advance the peripheral residents in order to reduce the risk of radiation exposure to the residents. On the other hand, according to the present embodiment, it is possible to maintain the pressure in the reactor containment vessel at a sufficiently low level without performing such reactor containment vessel venting, thereby obtaining an effect of increasing safety.

Further, a large amount of hydrogen released from the primary reactor containment vessel 3 through the gas phase vent pipe 6 is confined in the air bag 5 and is prevented from being mixed with the air atmosphere in the upper secondary reactor containment vessel 9, so that there is no risk of occurrence of detonation or deflagration. Since the main component of the gas inside the air bag 5 is a large amount of hydrogen, the air bag 5 is positioned in the upper portion of the upper secondary reactor containment vessel 9 due to the buoyancy of hydrogen. Even if a small amount of hydrogen leaks from the air bag 5, it moves to the further upper portion of the upper secondary reactor containment vessel 9 by the buoyancy of hydrogen itself and remains there. As a result, the hydrogen would not be mixed effectively with the air atmosphere in the upper secondary reactor containment vessel 9 that has been pushed down by the air bag 5.

Further, a large amount of radioactive gas released from the primary reactor containment vessel 3 through the gas phase vent pipe 6 is confined in the air bag 5 to be prevented from being released directly to the upper secondary reactor containment vessel 9, thereby obtaining an effect of forming a double barrier against diffusion of radioactive materials. The expansion of the air bag 5 pressurizes the atmosphere in the upper secondary reactor containment vessel 9 to equalize the inner and outer pressures of the air bag. That is, the inner-outer pressure difference does not occur with the air bag 5, thereby enhancing the double barrier effect against diffusion of radioactive materials by the air bag 5. As a result, it is possible to obtain a radiation leakage prevention effect innovatively higher than in a conventional typical double reactor containment vessel concept in which the pressure in the primary reactor containment vessel is higher than that in the secondary reactor containment vessel.

In a conventional double reactor containment vessel concept, the pressure in the primary reactor containment vessel is far higher than that in the secondary reactor containment vessel, thus making it impossible to prevent leakage of radioactive materials from the primary reactor containment vessel to the secondary reactor containment vessel. What could be done, upon occurrence of the leakage of radioactive materials to the secondary reactor containment vessel, is only to prevent the leakage of radioactive materials to the environment by maintaining the pressure in the secondary reactor containment vessel at a negative pressure relative to the ambient pressure. The only method for maintaining the pressure in the secondary reactor containment vessel at the negative pressure was to use an active system such as an exhaust fan to release the atmosphere in the secondary reactor containment vessel through a filter.

However, upon occurrence of a severe accident where it is highly likely that an external power source is not available, the above method in which an active system is used to maintain the pressure in the secondary reactor containment vessel at the negative pressure cannot be employed, resulting in loss of function of the double reactor containment vessel. In a conventional double reactor containment vessel concept, the function thereof can be maintained upon occurrence of the design basis accident where an external power source is available and the core fuel has not seriously been damaged; however, the function of the double reactor containment vessel is lost in a situation where the function of the double reactor containment vessel concept is required most due to occurrence of a severe accident accompanied by serious damage of the core fuel.

On the other hand, in the present embodiment, even upon occurrence of the severe accident where an external power source is not available, a large amount of radioactive materials in the primary reactor containment vessel 3 are fed to the air bag 5 in the upper secondary reactor containment vessel 9 by the pressure of the hydrogen gas accumulated in the primary reactor containment vessel 3 and can then be confined in the expanded air bag 5 whose inner-outer pressure difference has become zero. That is, both the transfer of the radioactive materials into the air bag 5 and maintenance of the outer pressure for subsequent confinement can be realized passively without use of an external power source or active equipment. By making an effective use of the static energy of a large amount of hydrogen generated upon occurrence of the severe accident, it is possible to achieve confinement of the radioactive gas.

Even if a core meltdown occurs upon occurrence of the severe accident and the melted-down core drops, penetrating the bottom portion of the reactor pressure vessel 2, core debris is received by the core catcher 42 to thereby prevent subsequent meltdown/erosion of the concrete floor of the reactor containment vessel 8. Further, the cooling water in the GDCS pool 22 and the water of the water shield 21 can be guided to the lower dry well 17 so as to flood the core debris in the core catcher 42 for cooling.

Although steam is generated by the heat of the core debris at this time, it is guided, by its own pressure, to the PCCS heat exchanger 33 through the suction pipe 34 to be condensed. Therefore, the overpressure in the reactor containment vessel 8 caused due to the steam generated by the heat of the core debris does not occur.

The condensate water is circulated to the GDCS pool 22 through the condensate water return pipe 36 and is used for flooding the lower dry well 17 once again. Because the air bag 5 is expanded, the pressure in the upper secondary reactor containment vessel 9 rises, with the result that the atmosphere in the upper secondary reactor containment vessel 9 pressurizes the water of the water shield 21 from above, so that the water of the water shield 21 is smoothly injected into the lower dry well 17. As a result, the reactor pressure vessel 2 is flooded with water up to above the top portion of the reactor core 1. Therefore, even if the core fuel remains in the reactor core 1, failure of the dry well 10 by heat of the core fuel can be prevented.

In place of the water shield 21, a configuration in which water is stored in a fuel pool (not illustrated) installed in the upper secondary reactor containment vessel 9 or a DS pit (not illustrated) for housing dryers, separators, and the like at the time of refueling can be used in the same manner.

[Other Embodiments]

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The features of the respective embodiments may be combined.

What is claimed is:

1. A reactor containment vessel comprising:
   a primary reactor containment vessel containing a reactor pressure vessel and having a certain pressure resistance higher than atmospheric pressure and a certain leak-tightness;
   a secondary reactor containment vessel installed outside of the primary reactor containment vessel and having a pressure resistance and a leak-tightness equivalent to the pressure resistance and the leak-tightness of the primary reactor containment vessel;
   an air bag installed in a folded state in the secondary reactor containment vessel, and upon an occurrence of an accident in the primary reactor containment vessel, the air bag is configured to
      receive high-pressure gas released from the primary reactor containment vessel, and
      expand from the folded state to an expanded state while confining the gas therein; and
   a gas phase vent pipe connecting the primary reactor containment vessel and the air bag,
   wherein a pressure in the air bag is equalized with a pressure in the secondary containment vessel at a time when expansion of the air bag is finished, thereby passively preventing leakage of the high-pressure gas from the primary containment vessel and the air bag.

2. The reactor containment vessel according to claim 1, wherein
   an isolation-communication switching unit is attached to the gas phase vent pipe.

3. The reactor containment vessel according to claim 1, wherein
   the primary reactor containment vessel includes a dry well containing the reactor pressure vessel and a wet well containing a suppression pool at its lower part and a gas phase at its upper part,
   the secondary reactor containment vessel is disposed above the primary reactor containment vessel, and
   the gas phase vent pipe connects the air bag and a gas phase of the wet well.

4. The reactor containment vessel according to claim 3, wherein
   the secondary reactor containment vessel includes an operation floor and is separated from the primary reactor containment vessel by a primary reactor containment vessel upper lid.

5. The reactor containment vessel according to claim 3, wherein
   a pool storing cooling water is installed inside the secondary reactor containment vessel, and a water surface of the cooling water in the pool is exposed to an atmosphere in the secondary reactor containment vessel,
   a strainer is installed inside the pool, and a drain pipe is guided to inside of the dry well by the strainer,
   a leading end of the drain pipe is opened in a lower dry well disposed below a vessel support for supporting the reactor pressure vessel in the dry well through a check valve, a U-shape seal, and an injection valve, and,
   when the air bag is expanded to cause pressure in the secondary reactor containment vessel to rise, the atmosphere in the secondary reactor containment vessel pressurizes the water surface of the cooling water in the pool to allow the cooling water to be guided to the lower dry well.

6. The reactor containment vessel according to claim 5, wherein
   a core catcher is installed on a floor of the lower dry well, and,
   when the air bag is expanded to cause the pressure in the secondary reactor containment vessel to rise, the atmosphere in the secondary reactor containment vessel pressurizes the water surface of the cooling water in the pool to allow the cooling water to be guided to the lower dry well so as to flood core debris dropped in the core catcher for cooling.

7. A nuclear power plant comprising:
   a reactor pressure vessel incorporating core fuel;
   a primary reactor containment vessel containing a reactor pressure vessel and having a certain pressure resistance higher than atmospheric pressure and a certain leak-tightness;
   a secondary reactor containment vessel installed outside of the primary reactor containment vessel and having a pressure resistance and a leak- tightness equivalent to the pressure resistance and the leak-tightness of the primary reactor containment vessel;
   an air bag installed in a folded state in the secondary reactor containment vessel, and upon an occurrence of an accident in the primary reactor containment vessel, the air bag is configured to
      receive high-pressure gas released from the primary reactor containment vessel, and
      expand from the folded state to an expanded state while confining the gas therein; and
   a gas phase vent pipe connecting the primary reactor containment vessel and the air bag;
   wherein a pressure in the air bag is equalized with a pressure in the secondary containment vessel at a time when expansion of the air bag is finished, thereby passively preventing leakage of the high-pressure gas from the primary containment vessel and the air bag.

8. The reactor containment vessel according to claim 1, wherein the air bag is comprised of a plastic material.

9. The nuclear power plant according to claim 7, wherein the air bag is comprised of a plastic material.

* * * * *